United States Patent
Sugiyama et al.

[11] 3,859,271
[45] Jan. 7, 1975

[54] REACTIVE YELLOW β-SULFATOETHYLSULFONYL PHENYLAZO-4-(1-SUBSTITUTED PHENYL-3-METHYL-5-AMINO)-PYRAZOLE DYES

[75] Inventors: Hiroshi Sugiyama, Ashiya-shi; Hideo Otsuka, Ibaraki-shi, Osaka; Masakuzu Yamamoto, Takarazuka-shi; Takuo Ikeda, Ibaraki-shi, Osaka; Masami Okuno, Minoo-shi, Osaka, all of Japan

[73] Assignee: Sumitomo Chemical Co., Ltd., Osaka, Japan

[22] Filed: Feb. 24, 1969

[21] Appl. No.: 801,795

[30] Foreign Application Priority Data
Feb. 28, 1968 Japan.............................. 43-13104
Feb. 28, 1968 Japan.............................. 43-13105

[52] U.S. Cl.................... 260/163, 8/41 R, 8/50, 260/310 R, 260/458, 260/509, 260/575

[51] Int. Cl.... C09b 26/38, C09b 62/82, D06p 1/38

[58] Field of Search................................... 260/163

[56] References Cited
UNITED STATES PATENTS
2,670,265 2/1954 Heyna et al.......................... 260/163
2,728,762 12/1955 Heyna et al.......................... 260/163

*Primary Examiner*—Floyd D. Higel
*Attorney, Agent, or Firm*—Sughrue, Rothwell, Mion, Zinn and Macpeak

[57] ABSTRACT

A reactive yellow dye having the formula

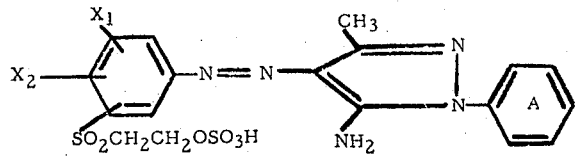

wherein $X_1$ and $X_2$ can each represent hydrogen atom, a lower alkyl group, a lower alkoxy group, a halogen atom, a carboxyl group, or a sulfonic acid group, and the nucleus A has at least one sulfonic acid group, and may have other substituents, is prepared by coupling a diazotized amine represented by the formula

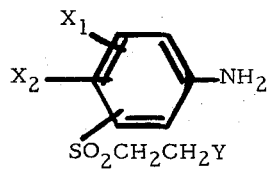

wherein each $X_1$ and $X_2$ mean the same as above and Y represents a hydroxy group or —$OSO_3H$ group with 1-substituted phenyl-3-methyl-5-amino-pyrazole represented by the formula

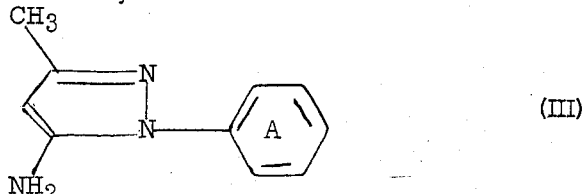

(III)

wherein the benzene nucleus A means the same as above; and thereafter treating the resulting mono-azo dye having a hydroxy group as Y in the formula II with sulfuric acid to convert the β-hydroxyethyl sulfone group to β-sulfatoethylsulfonyl group, and may be used for dyeing fibers a bright yellow shade with excellent fastness to light and washing.

8 Claims, No Drawings

REACTIVE YELLOW β-SULFATOETHYLSULFONYL PHENYLAZO-4-(1-SUBSTITUTED PHENYL-3-METHYL-5-AMINO)-PYRAZOLE DYES

BACKGROUND OF THE INVENTION

1. Field of the Invention

The present invention relates to reactive yellow dyes and to methods for forming the same.

2. Description of the Prior Art

To date, it has been found that a dye having the group $-SO_2CH_2CH_2OSO_3H$ or $-SO_2CH=CH_2$ can be applied to dyeing fiber materials as a so-called reactive dye. It has been, however, desired to obtain a dye which may be used for dyeing fiber materials of a clearer yellow shade with a more excellent fastness to light and washing, when compared with known dyes.

SUMMARY OF THE INVENTION

The present invention relates to a novel yellow monoazo dye and to a process for preparing the same. More particularly, the invention relates to a novel yellow monoazo dye having the formula

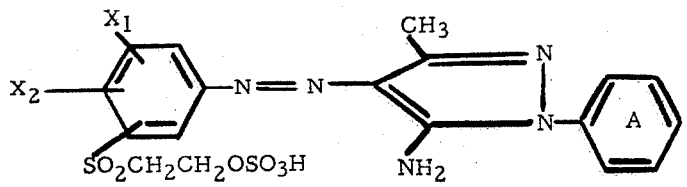

wherein $X_1$ and $X_2$ can each represent a hydrogen atom, a lower alkyl group, a lower alkoxy group, a halogen atom, a carboxyl group, or a sulfonic acid group, and the nucleus A has at least one sulfonic acid group and may have other substituents, and to a process for preparing the same.

The novel reactive dye of the present invention defined above may generally be prepared by coupling a diazotized amine represented by the formula

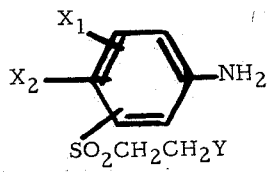

wherein $X_1$ and $X_2$ have the same meaning as defined above, and Y represents a hydroxy group or an $-OSO_3H$ group, with a 1-substituted phenyl-3-methyl-5-amino-pyrazole represented by the formula

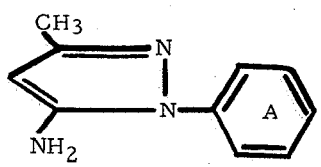

wherein the benzene nucleus A has the same meaning as defined above. Thereafter, the resulting mono-azo dye having a hydroxy group, such as Y in formula II, is treated with sulfuric acid to convert the β-hydroxyethyl sulfone group to the β-sulfatoethylsulfonyl group.

Thus, one object of the present invention is to provide a novel yellow monoazo dye. Another object of the present invention is to provide a process for preparing the same, and a dyeing process utilizing said novel dye.

Other objects of the invention will be apparent from the following detailed illustration.

DESCRIPTION OF THE PREFERRED EMBODIMENTS

These and other objects of the invention can be accomplished by provision of a novel yellow monoazo dye having the aforesaid formula (I) and a process for preparing the same which comprises coupling a diazotized amine represented by the formula:

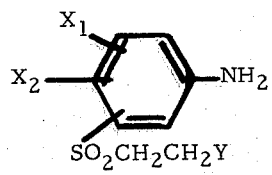

wherein $X_1$ and $X_2$ mean the same as above, and Y represents a hydroxy group or an $-OSO_3H$ group; with 1-substituted phenyl-3-methyl-5-aminopyrazole represented by the formula

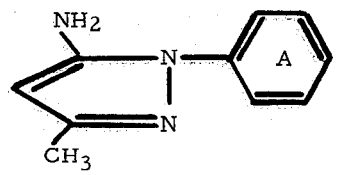

wherein the benzene nucleus A means the same as above; and treating the resulting mono-azo dye having a hydroxy group as Y in formula (II) with sulfuric acid to convert the β-hydroxyethyl sulfone group to a β-sulfatoethylsulfonyl group.

The amine represented by formula (II) above, one of the raw materials used in the process of the present invention, includes, for example, p-aniline-β-hydroxyethyl sulfone, m-aniline-β-hydroxyethyl sulfone, o-aniline-β-hydroxyethyl-sulfone, 2-methoxyaniline-5-β-hydroxyethyl sulfone, 2-methoxy-, or ethoxy-5-methylaniline-4-β-hydroxyethyl sulfone, 2,5-dimethoxy-, or diethoxy-aniline-4-β-hydroxyethylsulfone, 2-chloro aniline-5-β-hydroxyethyl sulfone, 2-methylaniline-5-β-hydroxyethylsulfone, 2-carboxyaniline-4-, or -5-, β-hydroxyethylsulfone, 2-sulfoaniline-5-β-hydroxyethylsulfone, 2.4-dimethoxyaniline-5-β-hydroxyethylsulfone.

These amines may be treated with sulfuric acid to be used in the form of a sulfuric acid ester. In addition, the acylamine derivatives of these amines can be used by converting a β-hydroxyethylsulfonyl group to a β-sulfatoethylsulfonyl group and simultaneously hydrolyzing the acylamino group. The diazotization of these amines or sulfuric acid esters thereof is carried out by means of conventional methods. These amines can also be treated with nitrosyl sulfuric acid to carry out the sulfuric esterification and diazotization simultaneously.

1-substituted phenyl-3-methyl-5-aminopyrazole, represented by the above formula (III), which is preferably used in the process of the present invention, includes a compound having, as the phenyl nucleus A, for example, 2'-sulfophenyl, 3'-sulfophenyl, 4'-sulfophenyl, 2',5'-disulfophenyl, 2'-chlor-5'-sulfophenyl, 2'-chlor-4'-sulfophenyl, 2',5'-dichlor-4'-sulfophenyl, 2'-chlor-6'-methyl-4'-sulfophenyl, 2'-nitro-4'-sulfophenyl, 2'-methoxy-5'-sulfophenyl, 4'-(4''-nitro-2''-sulfostyrene)-3'-sulfophenyl, etc.

The coupling of diazo compounds mentioned above with the 1-substituted phenyl-3-methyl-b 5-aminopyrazole represented by the above formula (III) can be carried out at a wide pH range according to conventional methods, with pH desirably below 7 to maintain the ester structure in case the diazo compound is a sulfuric acid ester.

The resultant monoazo dye having a β-hydroxyethyl sulfone group is treated in concentrated sulfuric acid at relatively lower temperature to make the sulfuric acid ester. The dye may be separated by means of salting-out, etc. after diluting the reaction mixture with ice water.

The dye formed according to the process of the present invention may be widely applied to conventional impregnating, printing and padding dyeing methods. The impregnating dyeing of cellulose fibers may be carried out in a dyeing bath with added Glauber's salt (or common salt) in the presence of tri-sodium phosphate, sodium hydroxide, sodium carbonate, etc. at a relatively lower temperature.

Padding dyeing may be carried out by applying an aqueous dye solution to fibers and simultaneously or subsequently steam or dry heating at a relatively higher temperature, for example 70° to 180°C., in the presence of an acid-binding agent, such as sodium bicarbonate, sodium carbonate, sodium hydroxide, trisodium phosphate, etc., or by padding the fibers which have previously had applied thereto only a solution of dyes, in a bath containing the above-described acid-binding agent at a relatively higher temperature, for example 80°-100°C. Also, boiling in water containing a large amount of inorganic salt may be used in place of steam or dry heating. Printing may be carried out by printing a printing paste containing a dye and a similar acid binding agent (as described above) onto the fiber, and thereafter steam or dry heating the printed fiber at 70°-180°C.; or by heat-treating the fiber printed with a printing paste containing only a dye in a bath containing the acid binding agent; or further by "printing" printing paste containing the acid binding agent on the fiber which has previously been printed with a paste containing only a dye and successively steam or dry heating it.

Further, a resist with a suitable acid and discharge with a suitable reductant are also possible with the dye of this invention.

Although impregnating dyeing of natural or synthetic polyamide fibers is conventionally carried out in a neutral or acidic bath, it is preferable to use a suitable cationic surface active agent, or to neutralize the bath with a mild alkali such as ammonia, hexamethylene-tetramine, etc. with the present invention. The dye of this invention is novel and highly soluble in water. Fiber material dyed with the dye of the invention has a clear yellow shade with excellent fastness to light and washing.

The present invention will be illustrated with the following examples, which are of course, not to limit the scope of the present invention. Parts and % are both by weight.

EXAMPLE 1

26.8 parts of 2-methoxyaniline-5-β-hydroxyethyl sulfone hydrochloride were added to 100 parts of ice water, 15.6 parts of 35% hydrochloric acid were added thereto, and then it was diazotized by adding (dropwise) an aqueous solution containing 6.9 parts of sodium nitrite. After the diazotization was completed, an excess of nitrous acid was decomposed with sulfamic acid. Coupling was completed by adding 130 parts of a neutral aqueous solution containing 25.3 parts by 1-(4'-sulfophenyl)-3-methyl-5-aminopyrazole to the diazo solution, and thereafter adding 24 parts of crystalline sodium acetate to neutralize the solution. After making the solution strongly acidic with hydrochloric acid, a precipitated crystal was filtered therefrom and dried. 15 parts of the dried product were added to 75 parts of 100% sulfuric acid at a temperature below 20°C. and, after four hours, the solution was poured into ice water, and the resulting precipitate was filtered. The wet residue was placed into water, neutralized with sodium bicarbonate to a pH of 5– 6, and salted out with potassium chloride. The precipitate was filtered and dried at below 60°C. 21 parts of a powder containing about 70% of the dye represented by the following structure were obtained:

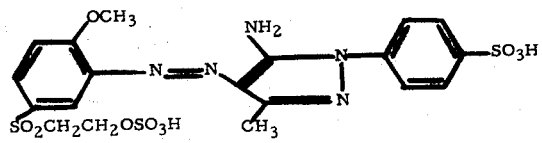

When dyeing a cotton with this dye using sodium bicarbonate as an acid binding agent, a bright greenish yellow dyeing with good fastness to light and washing resulted.

With the same process described above, except that 1-(3'-sulfophenyl)-3-methyl-5-aminopyrazole was employed in place of 1-(4'-sulfophenyl)-3-methyl-5-aminopyrazole, the dye having the formula

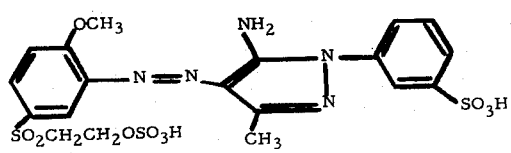

was obtained, and gave a dyeing similar to that mentioned above.

EXAMPLE 2

21 parts of the acid sulfuric ester of a p-aniline-β-hydroxyethylsulfone were mixed with 70 parts of ice water and 15 parts of 35% hydrochloric acid, ]nd ]n aqueous solution containing 5.2 parts of sodium nitrite were added thereto to diazotize. After stirring at below 10°C. for 2 hours, the excess of nitrous acid was decomposed with sulfamic acid. Coupling was completed

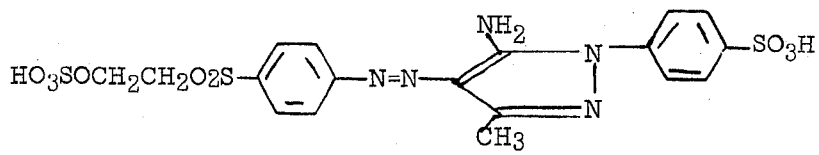

by adding 90 parts of a neutral aqueous solution containing 19 parts of 1-(4'-sulfophenyl)-3-methyl-5-aminopyrazole to the diazo-mixture, and then adjusting the pH to 5–6 with crystalline sodium acetate. After salting out by adding 15 parts of potassium chloride, the crystal was filtered and dried at below 70°C. 53 parts of a powder containing about 35 parts of the dye having the following structure were obtained:

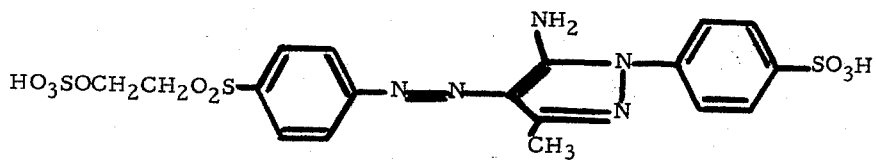

When dyeing a cotton with this dye using bicarbonate as an acid binding agent, a bright greenish yellow dyeing with good fastness to light and washing was obtained.

When carrying out the same operation using 23.4 parts of the acid sulfuric ester of 2-methoxyaniline-5-β-hydroxyethylsulfone in place of 21 parts of the acid sulfuric ester of p-aniline-β-hydroxyethylsulfone used in the above example, the same dye as in Example 1 was obtained with a good yield.

EXAMPLE 3

When applying the process in Example 1 or 2 using an amine or its acid sulfuric ester described in Column A and a 1-substituted phenyl-3-methyl-5-aminopyrazole described in Column B, a dye providing dyeing with the shade described in Column C was obtained at good yields.

was dissolved in 200 parts of water and 10 parts of anhydrous Glauber's salt were added thereto. After adding 10 parts of cotton yarn therein, the temperature was raised to 60°C., and subsequently 2 parts of crystalline trisodium phosphate, 0.2 parts of 40° Be' sodium hydroxide solution and 1 part of sodium carbonate were added thereto, and at this temperature the dyeing was carried out for one hour. Upon washing with water and soaping, a bright greenish yellow dyeing with good fastness to light and washing was obtained.

EXAMPLE 5

2 parts of the dye represented by the formula:

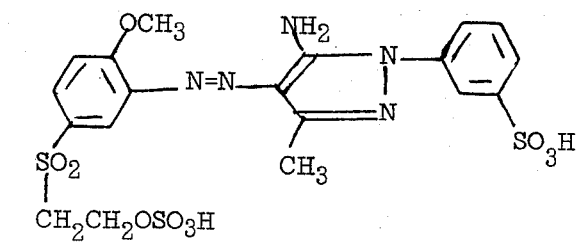

10 parts of urea, and 2 parts of sodium bicarbonate were dissolved in 100 parts of water at a temperature

| | A | B | C |
|---|---|---|---|
| | Amine | Substituted phenyl group in 1-substituted phenyl-3-methyl-5-pyrazole | shade |
| (1) | 2-methoxy-5-methyl-aniline-4-β-hydroxyethylsulfone | 3'-sulfophenyl | reddish yellow |
| (2) | do. | 4'-sulfophenyl | similar as above |
| (3) | m-aniline-β-hydroxyethylsulfone | 4'-sulfophenyl | greenish yellow |
| (4) | p-aniline-β-hydroxyethylsulfone | 2'-chloro-5'-sulfophenyl | more greenish yellow than that in Ex. 1 |
| (5) | do. | 4'-(4''-nitro-3''-sulfostyryl)-3'-sulfophenyl | yellow |
| (6) | do. | 2'-nitro-4'-sulfophenyl | yellow |
| (7) | 2-sulfoaniline-5-β-hydroxyethylsulfone | 4'-sulfophenyl | greenish yellow |
| (8) | 2-methylaniline-5-β-hydroxyethylsulfone | 4'-sulfophenyl | The similar as that in Example 1 |
| (9) | 2-carboxyaniline-5-β-hydroxyethylsulfone | 4'-sulfophenyl | yellow |
| (10) | o-aniline-β-hydroxyethylsulfone | 3'-sulfophenyl | greenish yellow |

EXAMPLE 4

0.3 parts of the dye represented by the formula:

below 20°C., and a cotton cloth was padded in this solution, and then, after predrying, was steamed at 100° to 103°C. for 7 to 10 minutes. Subsequently, when washing with water and soaping, a bright greenish yellow dyeing with good fastness to light and washing was obtained, the shade being more greenish than that of Example 4.

EXAMPLE 6

2 parts of the dye represented by the formula

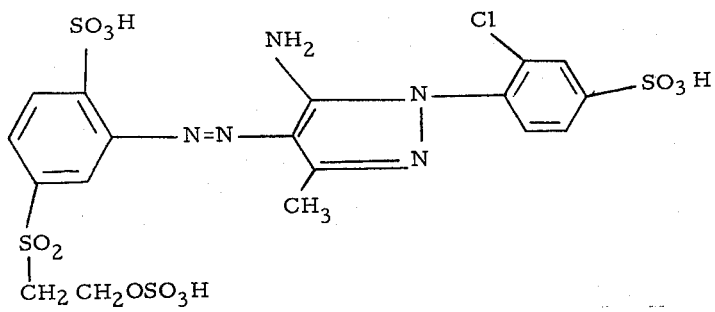

3 parts of sodium bicarbonate, and 5 parts of urea were dissolved in 100 parts of water at a temperature below 20°C., and a cotton cloth was padded in this solution and, after predrying, was cured at 140°C. for 2 minutes. Subsequently, when washing with water and soaping, a bright greenish yellow dyeing with good fastness to light and washing was obtained, the shade being more greenish-yellow than that of Example 5.

EXAMPLE 7

2 parts of the dye represented by the formula

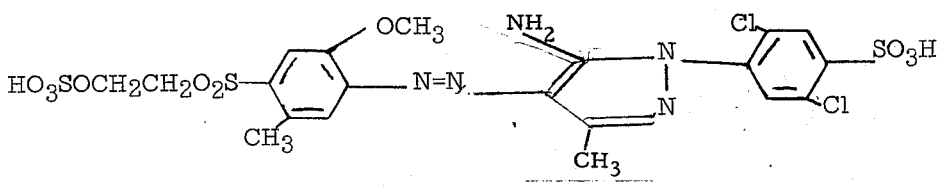

1 part of crystalline trisodium phosphate, and 1 part of 40° Be′ sodium hydroxide were dissolved in 100 parts of water, and a cotton cloth was padded in this solution, wound up and allowed to stand at 40°C. for 10 hours. Subsequently, when washing with water and soaping, a yellow dyeing with good fastness to light and washing was obtained.

EXAMPLE 8

2 parts of the dye represented by the formula

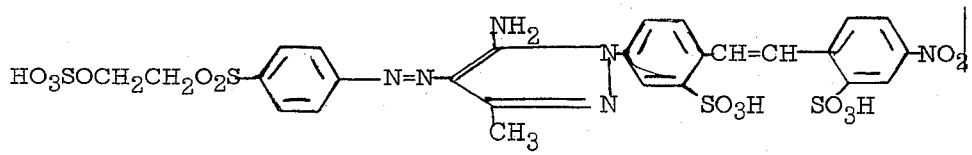

were dissolved in 100 parts of water and a cotton cloth was padded in this solution, and, after predrying, was padded in a solution containing 200 parts of salt and 2 parts of sodium hydroxide in 100 parts of water. It subsequently was steamed at 100° to 105°C. for 20 to 30 seconds. Then, when washing with water and soaping, a yellow dyeing with good fastness to light and washing was obtained.

EXAMPLE 9

2 parts of the dye represented by the formula

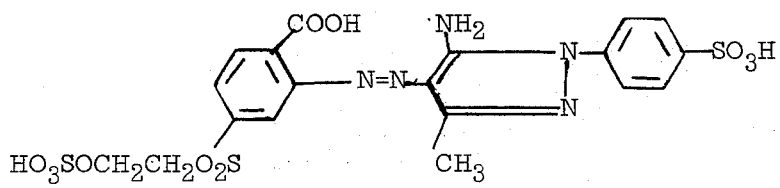

were dissolved in 100 parts of water, and a cotton cloth was padded in this solution, and, after predrying, was impregnated in a solution containing 20 parts of sodium carbonate, 10 parts of salt, and 7 parts of 40°Be′ sodium hydroxide in 100 parts of water at 90°C. for 3 seconds. Subsequently, when washing with water and soaping, a greenish yellow dyeing with good fasteness to light and washing was obtained.

EXAMPLE 10

0.5 part of the dye represented by the formula

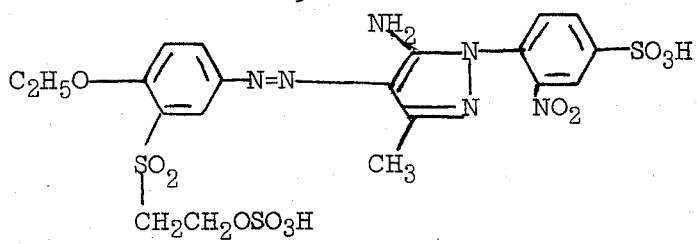

and 5 parts of urea were dissolved in 30 parts of hot water, and, after adding 45 parts of sodium alginate, the total was made to 100 parts with water and sodium alginate. A cotton cloth was printed with the paste prepared above, the printed cloth was predried, and thereafter, was impregnated in 100 parts of an aqueous solution having 10 parts of common salt, 15 parts of sodium carbonate, 5 parts of potassium carbonate, 3 parts of 40°Be' sodium hydroxide and 1 part of sodium silicate at 95°C. for 10 seconds. Subsequently, when washing with water and soaping, a yellow dyeing with good fastness to light and washing was obtained.

EXAMPLE 11

0.2 part of the dye represented by the formula

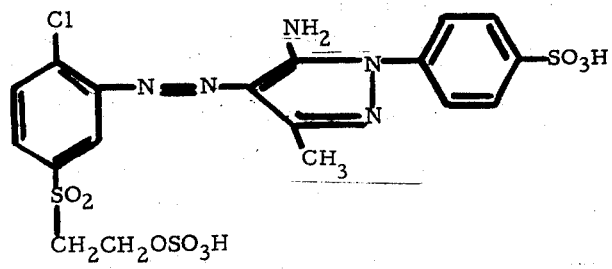

was dissolved in 300 parts of water, and 3 parts of acetic acid was added thereto. 10 parts of a wool was impregnated therein, and dyeing was commenced at 50°C. and carried out at 90°-100°C. for one hour. Subsequently, the dyeing bath was neutralized with ammonia or hexamethylenetetramine and dyeing was continued further for about 30 minutes. Then, when washing with water and soaping, a greenish yellow dyeing with good fasteness to light and washing was obtained.

To further amplify upon several aspects of the present invention, generally in the coupling reaction the pyrazole and amine compound are reacted in 1 mole of pyrazole to 1 mole of amine ratio. Temperature of reaction is most preferably within the range 0°-25°C. Pressure of reaction can vary, but most preferably, atmospheric pressure is used. The reaction generally takes from about 15 minutes to about 5 hours to proceed to completion, the time of reaction being essentially non-critical. The pH should be maintained within the range 2-11.

For the "conversion" reaction, generally from about 1.5-10 parts acid are utilized. The temperature of conversion is most preferably within the range 0°-40°C. Again, this reaction is most preferably conducted at atmospheric pressure, within the time of from 1-10 hours. The pH of the media should be strongly acid, generally reaction in concentrated sulfonic acid being preferred.

With respect to the terms "lower alkyl" and "lower alkoxy", utilized in the specification, this means that most preferably 1 or 2 carbon atoms are present.

To further define the "salting out" procedure, generally from about 2-10 times the amount of ice water of sulfonic acid utilized is used. Salting out can be performed by adding 5-30% sodium chloride or karium chloride.

To further amplify upon the examples, in Examples 1 and 2, the 1-(4'-sulfophenyl)-3-methyl-5-aminopyrazole solution dissolved at a pH of 6-7.5 using sodium carbonate at 10°C. Further, in Example 1, coupling occurred at a pH of 2-5, and a temperature of 3°-7°C. In Example 2, coupling was at a pH of 2-6 and a temperature of 3°-7°C.

With respect to the "binding agent" embodiment of the present invention, generally 0.5-25 parts of binding agent per part of dye are utilized.

What is claimed is:

1. A compound of the formula

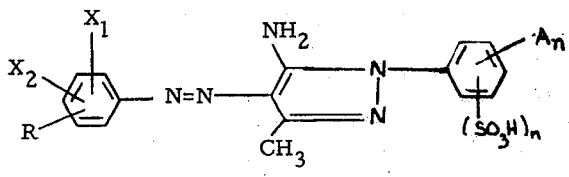

wherein R is

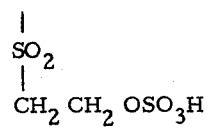

$X_1$ and $X_2$ represent a member selected from the group consisting of a hydrogen atom, chlorine atom, methyl group, methoxy group, ethoxy group, carboxyl group, and sulfonic acid group; A represents a member selected from the group consisting of a hydrogen atom, chlorine atom, methyl group, methoxy group and nitro group; and $n$ is an integer of 1 or 2.

2. The compound of claim 1 wherein $n$ is 1.

3. The compound of claim 1 wherein the moiety

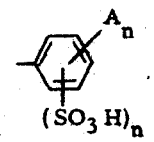

is a member selected from the group consisting of:

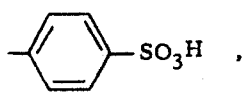
, 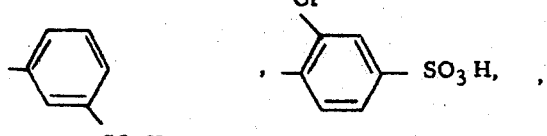

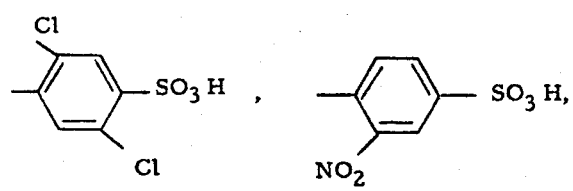, 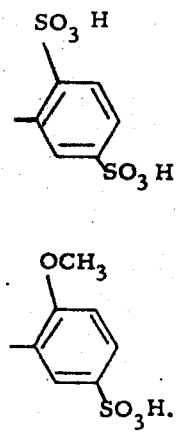,
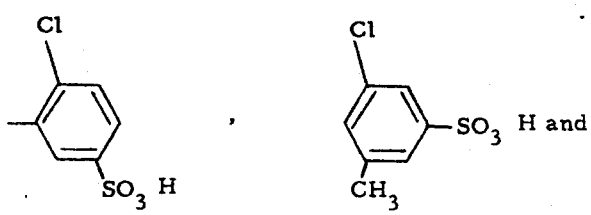
4. The compound of claim 1 wherein the moiety
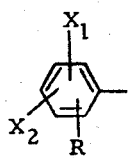
is a member selected from the group consisting of:
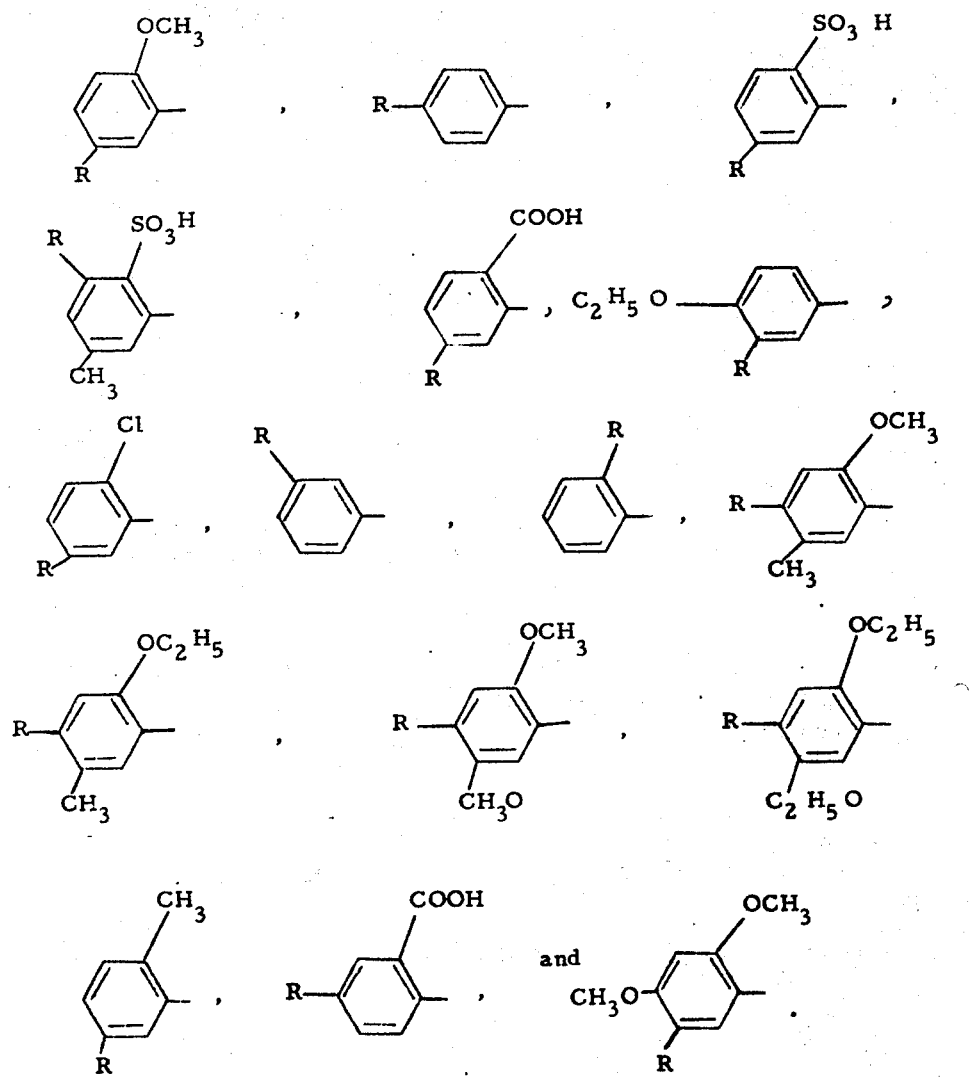

5. The compound of claim 1 which is a member selected from the group consisting of
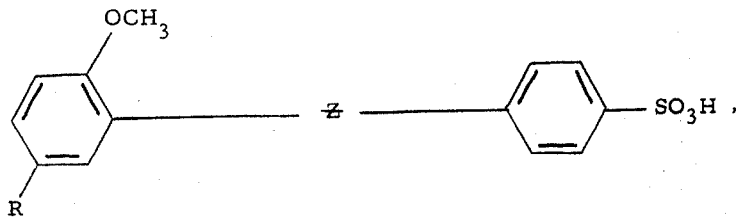
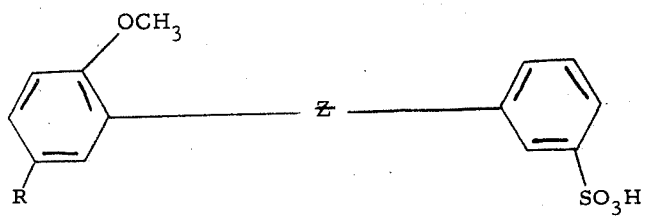
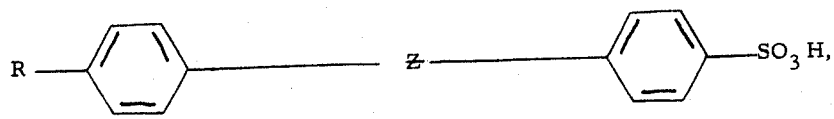
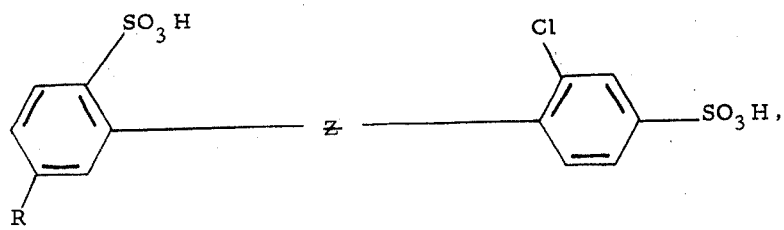
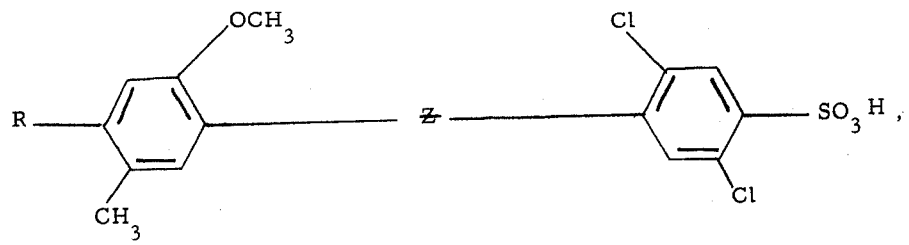
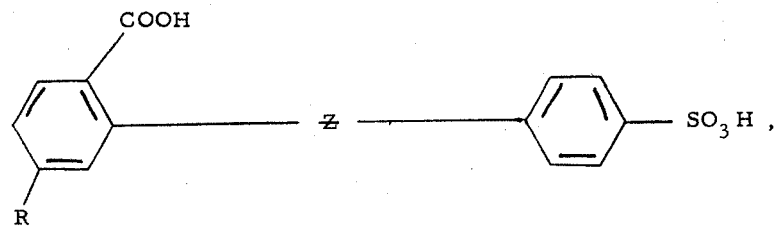
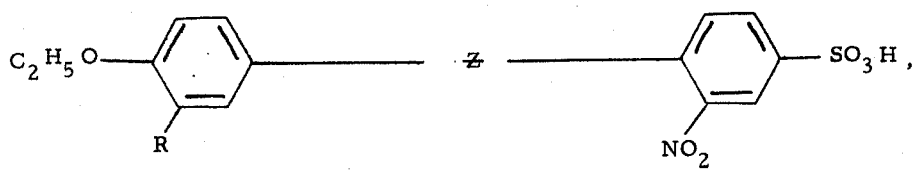

and

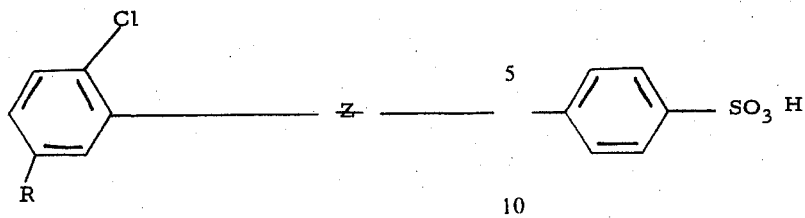

wherein Z is

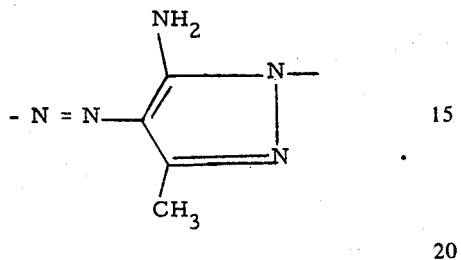

6. The compound of claim 1 wherein for $(SO_3H)_n$ $n = 1$, and for $A_n$ $n = 1$, wherein one A moiety is H and the second A moiety is selected from the group consisting of: chloro, methyl, methyl, methoxy and nitro, a methoxy group and a nitro group.

7. The compound of claim 1 wherein for $(SO_3H)_n$ $n = 1$ and for $A_n$ $n = 2$, wherein said compound is selected from the group consisting of compounds having the following A moiety pairs: chlorine and chlorine: hydrogen and hydrogen: chlorine and methyl.

8. The compound of claim 1 which is:

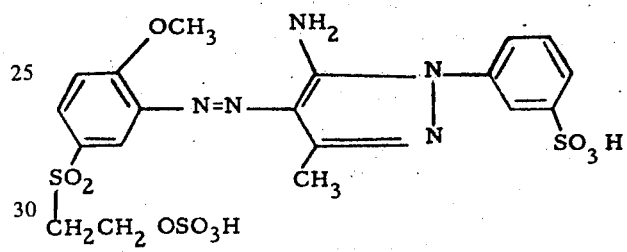

* * * * *